United States Patent [19]
Getz et al.

[11] Patent Number: 5,662,767
[45] Date of Patent: Sep. 2, 1997

[54] METHOD FOR APPLYING AN ADHESIVE-COATED MATERIAL

[75] Inventors: John L. Getz, Blachly; Terry Lee Weeks, Junction City, both of Oreg.

[73] Assignee: Industrial Adhesives, Inc., Eugene, Oreg.

[21] Appl. No.: 563,990

[22] Filed: Nov. 29, 1995

[51] Int. Cl.$^6$ .............................. B32B 31/00; C09J 5/06
[52] U.S. Cl. .......................... 156/498; 156/499; 156/543
[58] Field of Search ..................................... 156/282, 543, 156/544, 554, 578, 166, 176, 498, 499, 93

[56] References Cited

U.S. PATENT DOCUMENTS

| | | | |
|---|---|---|---|
| 3,143,456 | 8/1964 | McGrath et al. | 161/101 |
| 3,875,368 | 4/1975 | Biewald | 219/243 |
| 4,285,758 | 8/1981 | Clausen et al. | 156/498 |
| 4,692,202 | 9/1987 | Getz | 156/554 |

*Primary Examiner*—David A. Simmons
*Assistant Examiner*—J. A. Lorengo
*Attorney, Agent, or Firm*—Chernoff, Vilhauer, McClung & Stenzel

[57] ABSTRACT

A method and apparatus for applying an elongate continuous adhesive-coated reinforcing material such as a string or tape to the surface of a moving substrate is disclosed. A length of the adhesive-coated reinforcing material is heated in a heating unit to the flow point of the adhesive and is thereafter pressed onto the substrate by the rotatable peripheral surface of a wheel that is mounted for rotation on an axle. The heating unit includes an elongate hollow outlet portion having a generally constant radius of curvature that encourages the softened adhesive to concentrate on the bonding surface of the material. A heat-transferable tube is removably located in the heating unit. The heat transferable tube is easily replaced if it becomes worn or fouled with adhesive. Adhesive that separates from the material as it exits the heating unit is intercepted and applied to the substrate. An axle cover prevents the heated, reinforcing material from contacting and interfering with rotation of the wheel. The apparatus eliminates adhesive buildup on floor or frame.

11 Claims, 3 Drawing Sheets

METHOD FOR APPLYING AN ADHESIVE-COATED MATERIAL

BACKGROUND AND SUMMARY OF THE INVENTION

This invention relates to bonding apparatus, and more particularly to a method and apparatus for applying an elongate continuous adhesive-coated reinforcing material to the surface of a moving substrate.

In the plywood industry, manufacturing procedures often include adding a continuous strand of a reinforcing material to the surface of a substrate such as a veneer. In one such procedure, a reinforcing string or tape that is coated and impregnated with a hot melt adhesive is applied to the surface of composed veneer sheets. The hot melt adhesive is typically a thermoplastic adhesive which is a solid at lower temperatures and which is softened for application at higher temperatures. For proper application of the adhesive-impregnated string or tape, the adhesive must be heated to its flow point before being applied to the substrate. Thus the application equipment for the adhesive-coated reinforcing material typically includes a heating element for softening and activating the adhesive, and a wheel, often chilled, for pressing and bonding the heated string or tape to the surface of a substrate. Typical application equipment is shown, for example, in U.S. Pat. No. 4,285,758 to Clausen et al., and U.S. Pat. No. 4,692,202 to Getz.

During application, as the adhesive-coated string or tape material is exposed to the heating element, the adhesive is heated to its flow point. Some of the adhesive may flow and separate from the string or tape before the material is applied to the substrate. Thus, when using a conventional applicator, over a period of time the heating element becomes fouled with the separated hot melt adhesive which chars and solidifies in the heating element. When this occurs the manufacturing process must be interrupted while the applicator is shut down, cooled, and the heating element is cleaned. During the cleaning process the operator attempts to remove the solid and charred adhesive without damaging the heating element, for example by drilling, brushing or scraping the adhesive from the heating element. Typically, the methods most effective in removing the adhesive are also the most hazardous to the heating element. Often the entire heating element must be replaced, either because it has become too fouled to be cleaned or because it is damaged during cleaning.

In addition, when the applicator is used to apply the string or tape material to the underside of a substrate, separated adhesive also drips onto the applicator frame or onto the floor as the heated string or tape material leaves the heating element. In this case, frequent cleaning of the dripped adhesive from the frame and floor is required to prevent debris from accumulating at the applicator, and production must often be curtailed for this routine maintenance.

The adhesive-coated string or tape material may be applied to substrates which are being processed through machinery at speeds up to 1000 feet per minute. At such application speeds, if the material slips from its application path, the material tends to rub against or wrap around the axle of the wheel intended to press the string or tape material against the substrate. Such stress creates pressure between the wheel and wheel frame, causing wheel binding and, ultimately, bearing and seal failures.

Thus, a need exists for a method and an applicator for efficiently applying an elongate continuous adhesive-coated reinforcing material to a substrate while overcoming the problems of prior applicators.

According to one aspect of the present invention, such a need is satisfied by heating a length of an elongate continuous reinforcing material having an adhesive intimately associated with and coating the material by moving the length through a heating unit from an inlet orifice to an outlet orifice while heating and softening the adhesive to its flow point. At least a portion of the adhesive flows and becomes disassociated from the reinforcing material when the reinforcing material exits the outlet orifice. The length of heated reinforcing material is pressed onto a substrate located proximate the outlet orifice, and the disassociated portion of the adhesive is intercepted and applied to the substrate. Thus, the applicator apparatus and the floor around it remain free from any adhesive that separates from the reinforcing material during the application process.

According to another aspect of the invention, a heat-transferrable elongate tube is inserted into the heating unit and a length of the reinforcing material is heated by moving it through the tube from a tube inlet to a tube outlet. The tube is removably located in the heating unit. Thus, if the tube becomes fouled with adhesive or other wood product debris from the manufacturing operation, the tube can simply be removed from the heater and replaced with a new tube without disassembling the applicator and with minimal applicator downtime.

According to another aspect of the invention, a length of the reinforcing material is moved through the heating unit including an elongate hollow outlet portion having a substantially constant radius of curvature. The reinforcing material enters the heating unit at an inlet orifice and exits the heating unit at an outlet orifice. The heated reinforcing material exits the heating unit on an arcuate path defined by the elongate hollow outlet portion through the outlet orifice. This arcuate path permits application of the heated reinforcing material to a substrate at the highest application speeds without applying significant and undue tension to the heated reinforcing material. In addition, the arcuate application path defined by the outlet portion encourages the softened adhesive to collect on that portion of the reinforcing material most distant from its area of contact with the elongate outlet portion, thus fostering an accumulation of adhesive at the eventual point of contact between reinforcing material and substrate for a secure bond between the two.

According to another aspect of the invention, the reinforcing material is heated and applied to the substrate by contacting the substrate and the length of reinforcing material with the rotatable peripheral surface of a wheel mounted for rotation on an axle while preventing the length of reinforcing material from contacting the axle and interfering with the rotation of the wheel. Thus, even if the reinforcing material becomes dislodged from its application path, it is prevented from interfering with the rotation of the wheel or damaging the axle.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
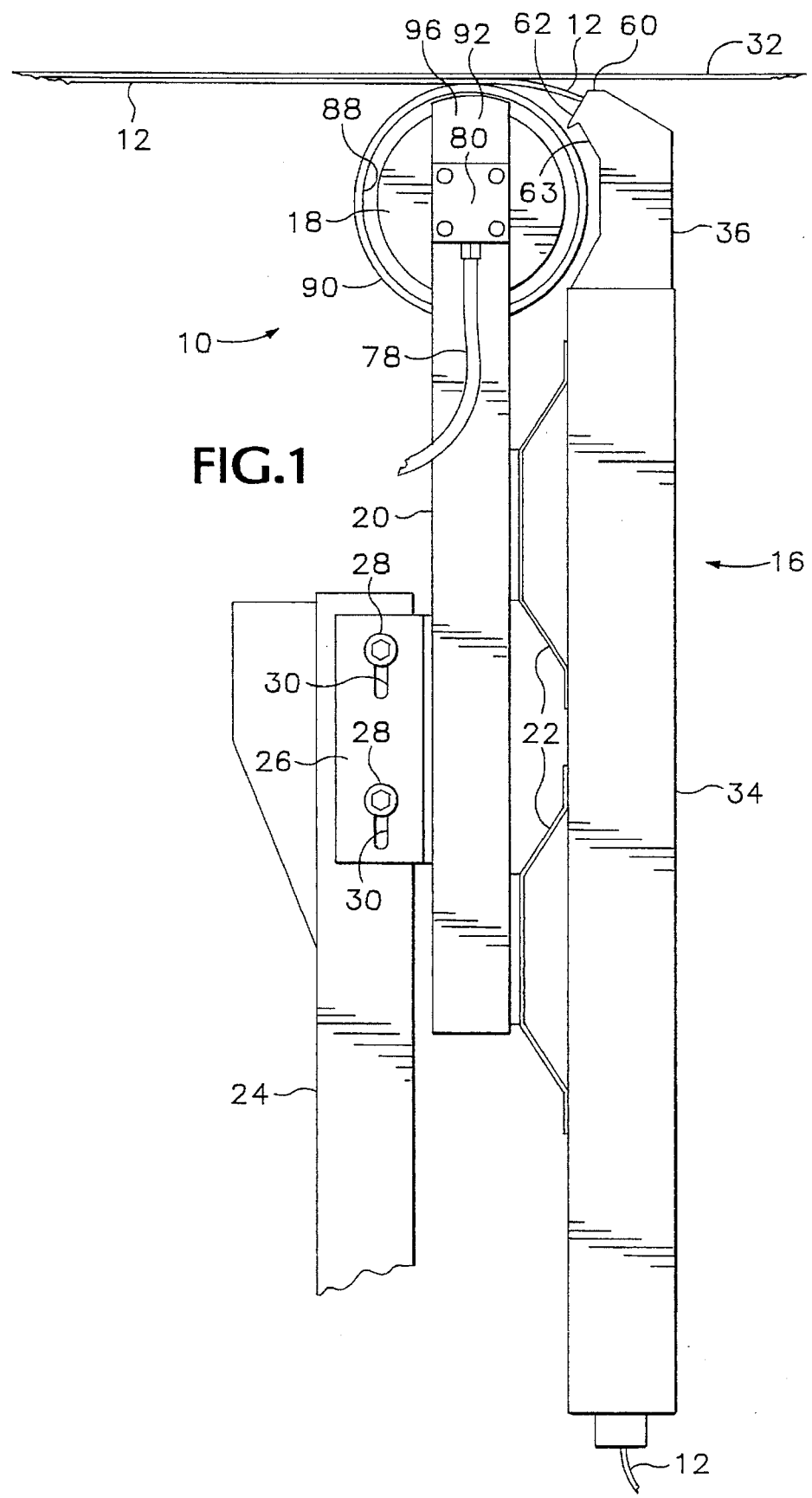
FIG. 1 is a side elevational view of exemplary application apparatus embodying the present invention.

Referring now to an exemplary embodiment illustrated in the drawings, apparatus 10 for applying an elongate continuous reinforcing material, such as a string 12 that is closely associated and coated with an adhesive 14 (FIG. 3) which is preferably a hot melt or thermoplastic adhesive, includes a heating unit 16 and a wheel 18. The wheel 18 is mounted on a wheel support 20 which is connected to the heating unit 16 by a brace 22. A mounting bracket 26 is attached to the wheel support 20 and connects the apparatus 10 to a supporting frame 24. The vertical position of the bracket 26, and thus of the wheel support 20 and heating unit 16, is adjusted by loosening bolts 28 and raising or lowering the bracket the length of slots 30. Final pressure adjustment of the wheel 18 on a substrate 32 is thus possible. For most applications a pressure of 12 to 17 pounds is desirable.

Figure 2:
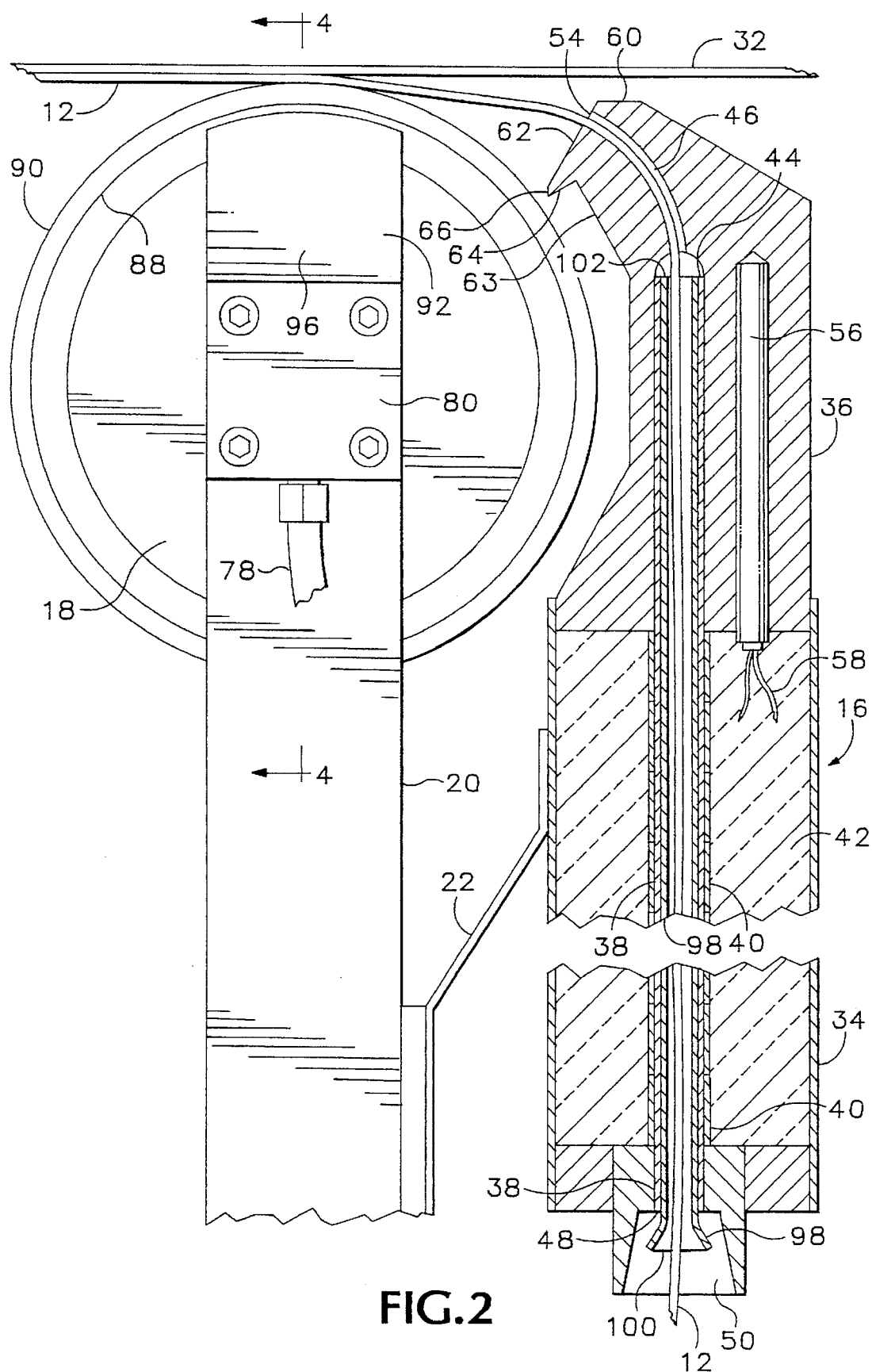
FIG. 2 is an enlarged partially sectional side view of a portion of the exemplary application apparatus shown in FIG. 1.

The heating unit 16 is located in a housing 34 having an end piece 36. The housing 34 supports a tubular central core 38 that is spirally-wrapped with heat tape 40, and surrounded by insulation 42 (FIG. 2). The core temperature is controlled by a signal from a resistance temperature detector (not shown) that is located in the core 38 and that is connected to a programmable temperature controller (not shown). A preferred core temperature is between b 325° and 350° F. An additional heater element 56 with a Separate temperature control is located in the end piece 36. The heater element 56 is energized by appropriate electrical conductors 58 from an electrical source and control unit (not shown). A preferred temperature in the end piece 36 is 340°–350° F. One end 44 of the central core 38, located in the end piece 36, communicates with an elongate hollow outlet portion 46 of the heating unit 16 and the other end 48 of the central core is proximate the inlet orifice 50 of the heating unit. The hollow outlet portion 46 of the heating unit 16 has a substantially constant radius of curvature 52 (FIG. 3) that provides an arcuate pathway for the elongate reinforcing material passing through the heating unit. The inside diameter of the hollow outlet portion 46 is small, for example, about ⅛th inch, approximately about twice the diameter of the typical adhesive-coated string which will pass therethrough. The outlet portion 46 of the heating unit 16 terminates in an outlet orifice 54.

The end piece 36 defines a first planar surface 60 that is proximate the substrate 32 when the heating unit 16 is mounted for use (FIG. 2). The first planar surface 60 intersects a second planar surface 62 at an obtuse angle which is interrupted by the outlet orifice 54. An angular cutout 63 defines a projection 64 which includes a lip 66. The cutout 63 permits the wheel 18 to be mounted with a peripheral surface 90 in close proximity to the lip 66.

Figure 4:
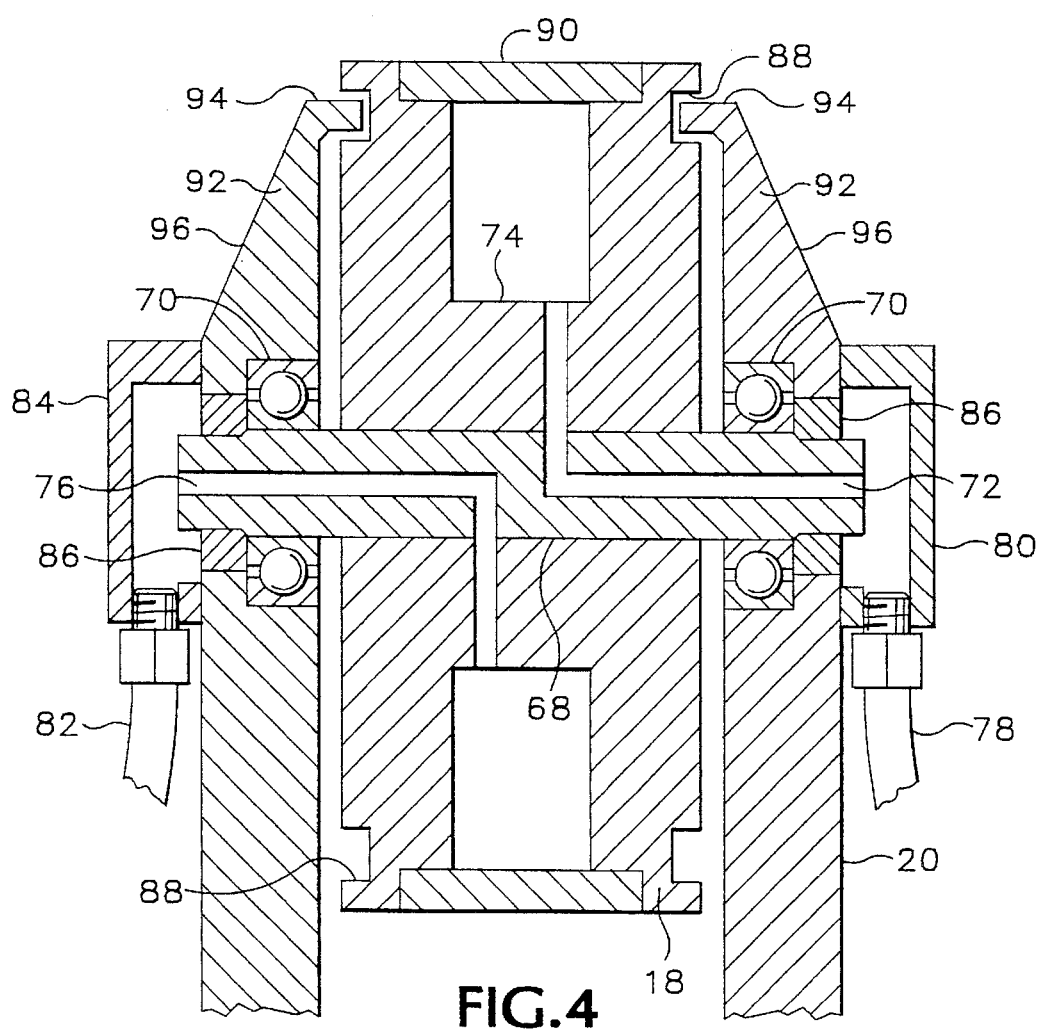
FIG. 4 is an enlarged sectional view taken along line 4—4 of FIG. 2.

The wheel 18 rotates with supporting axle 68 and is mounted with bearings 70 at an end of the wheel support 20 (FIG. 4). The axle 68 defines an inlet conduit 72 for conducting fluid into a wheel chamber 74 and an outlet conduit 76 for conducting fluid away from the wheel chamber. An inlet tube 78 is threadedly attached to an inlet fitting 80 and provides a source of cooling fluid to the wheel chamber 74 through the inlet conduit 72. An outlet tube 82, threadedly attached to an outlet fitting 84, conducts fluid away from the wheel chamber 74 through the outlet conduit 76. A seal 86 on each of the outlet fitting 84 and inlet fitting 80 prevents fluid from leaking from the system. The wheel 18 is cooled internally by the cooling fluid, which preferably is cooled and recirculated in a closed system. The temperature of the fluid thus controls the temperature of the wheel. A preferred circulating fluid is chilled water.

The wheel 18 defines two grooves 88, one located on each side of the wheel proximate the peripheral surface 90 of the wheel. An axle cover 92 on each end of the axle 68 extends from the inlet fitting 80 and outlet fitting 84 of the axle toward the peripheral surface 90 of the wheel. A tongue 94 projects from each axle cover 92 toward the wheel 18 and cooperatively engages the groove 88. The axle cover 92 thus defines a smooth sloping surface 96 extending from the tongue 94 proximate the wheel 18 to the inlet fitting 80 or outlet fitting 84 on the axle 68 (FIG. 4). In the event the string 12 becomes dislodged from the application pathway the axle cover 92 prevents the string from dropping onto the axle 68. Instead, the string 12 falls onto the axle cover 92 and the sloping surface 96 eases the string away from the wheel 18.

A heat-transferrable elongate tube 98 is insertable in the central core 38 of the heating unit 16 through a heater inlet orifice 50 (FIG. 2). The tube 98 is constructed with a slight curve between its inlet end 100 and outlet end 102 so that when the tube is inserted into the central core 38, which lacks a curve, the tube is straightened and thus remains firmly in place. When inserted in the heating unit 16, the tube 98 transfers heat from the central core 38 to the string 12 passing therethrough. The inside diameter of the tube 98 is the same or slightly larger than the inside diameter of the hollow outlet portion 46 of the heating unit 16. By reducing the effective diameter of the central core 38, heat transfer from the tube 98 to the string 12 is more efficient. The smaller diameter tube 98 minimizes the internal buildup of adhesive 14, which reduces the amount of stagnant adhesive susceptible to charring, and lessens the intermittent discharge of globs of adhesive with the string 12. Any adhesive 14 that separates from the string 12 in the heating unit 16 accumulates in the tube 98. If the tube 98 becomes worn or contaminated, it is easily removed from the heating unit 16 without extended apparatus downtime. A new tube is quickly replaceable in the heating unit.

For operation, the apparatus 10 is placed in position relative to the substrate 32 and the cooling fluid is circulated through the wheel 18. The heat-transferrable tube 98 is inserted into the central core 38 of the heating unit 16, and a continuous elongate reinforcing material, such as the string 12 coated with adhesive 14, is threaded through the heating unit from the tube inlet 100 to the outlet orifice 54. Suitable continuous elongate reinforcing material is available from Industrial Adhesives, Inc. of Eugene, Oreg. under the brand names Plystring and Plytape. The heating unit 16, including the central core 38 and the elongate hollow portion 46, is heated to temperature by the heat tape 40 and heater element 56, and the heat-transferrable tube 98 is heated by the central core. As the string 12 passes through the heating unit 16 from the inlet orifice 50 to the outlet orifice 54, the string and its adhesive coating are heated to the flow point of the adhesive 14. The string 12 exits the heating unit 16 and is pressed by the wheel 18 onto the substrate 32. The wheel 18 is cooled internally by the circulating cooling fluid so that when the peripheral surface 90 of the wheel 18 contacts the substrate 32 and the string 12, the string is pressed onto the substrate as the adhesive is cooled below its flow point.

Figure 3:
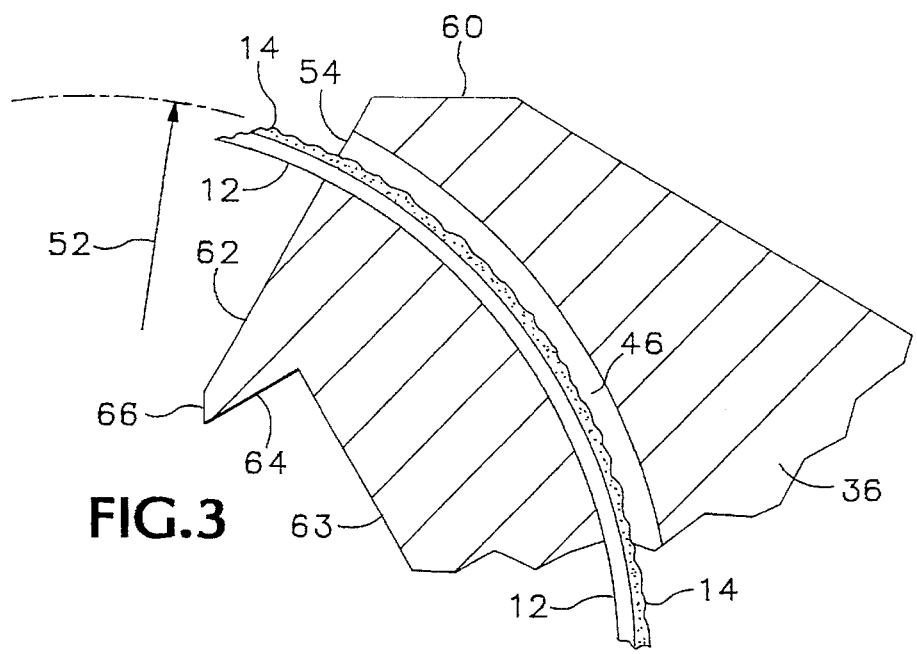
FIG. 3 is an enlarged sectional view of a portion of the heating unit shown in FIG. 2.

The elongate string 12 exits the heating unit 16 on an arcuate pathway defined by the hollow outlet portion 46 of the heating unit 16. As the string 12 slides through the outlet portion 46, the radius of curvature 52 of the arcuate pathway and the relatively small outlet orifice 54 together cause the adhesive 14 to redistribute on the string (FIG. 3). The amount of adhesive 14 on the surface of the string 12 located farthest from the surface of the outlet portion 46 is increased relative to the amount of adhesive remaining on the surface of the string contacting the outlet portion. Thus, when the string 12 is pressed by the wheel 18 onto the substrate 32 a firm bond is formed between string and substrate. The outlet portion 46 of the heating unit 16 preferably defines a short pathway, typically 2 inches or less. The exact radius of curvature of the outlet portion is important because if the curve is too tight or too straight the redistribution of the adhesive is minimal.

As the heated string 12 exits the outlet orifice 54, any adhesive 14 that becomes disassociated from the string collects on the inclined planar surface 62. The adhesive 14 forms into drops which move down the inclined surface 62 to the lip 66, which thus serves as a drip ledge. Upon reaching a critical size the drops fall from the lip 66 onto the rotating surface 90 of the wheel 18 and are carried by the wheel to the substrate 32. The adhesive 14 that separates from the string 12 at the outlet orifice 54 is thus intercepted and eventually applied to the substrate 32 so that the applicator and floor remain free of adhesive. In addition, since the outlet orifice 54 is located in the planar surface 62, it is protected from contamination by falling debris from the substrate by the planar surface 60.

Although the applicator is illustrated and described as an underside applicator, it will be noted that the applicator can also be mounted for use as a topside applicator.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of applying an elongate continuous reinforcing material having an intimately associated adhesive, said adhesive being a coating on said reinforcing material, comprising:

(a) heating a length of said reinforcing material by moving said length through a heating unit from an inlet orifice to an outlet orifice, said outlet orifice on an inclined planar surface sloped outwardly and downwardly;

(b) during step (a), heating and softening said adhesive to a flow point of said adhesive, at least a portion of said adhesive flowing and becoming disassociated from said reinforcing material when said reinforcing material exits said outlet orifice;

(c) pressing said length of reinforcing material heated in step (a) onto a bottom surface of a substrate located proximate said outlet orifice;

(d) said inclined planar surface intercepting said portion of said adhesive, said inclined planar surface terminating above a cooling wheel;

(e) said cooling wheel further intercepting said portion; and (f) applying at least said portion to said bottom surface of said substrate.

2. The method of claim 1 wherein said reinforcing material exits said outlet orifice on an arcuate path defined by an outlet portion of said heating unit having a substantially constant radius of curvature.

3. The method of claim 1 wherein step (e) includes transferring at least said portion to said substrate on a peripheral surface of a rotating wheel.

4. A method of applying an elongate continuous reinforcing material having an intimately associated adhesive, said adhesive being a coating on said reinforcing material, comprising:

(a) inserting a removable heat-transferrable elongate tube into a heating unit;

(b) heating a length of said reinforcing material by moving said length through said elongate tube from a tube inlet to a tube outlet, said tube being removably located in said heating unit;

(c) during step (b), heating and softening said adhesive to a flow point of said adhesive; and (d) pressing said length of said reinforcing material heated in step (b) onto said substrate.

5. The method of claim 4 wherein step (b) includes moving said length along an arcuate path defined by an outlet portion of said heating unit having a substantially constant radius of curvature from proximate said tube outlet to a heating unit outlet orifice.

6. A method of applying an elongate continuous reinforcing material having an intimately associated adhesive, said adhesive being a coating on said reinforcing material, comprising:

(a) heating a length of said reinforcing material moving said length through a heating unit from an inlet to an outlet;

(b) during step (a), heating and softening said adhesive to a flow point of said adhesive;

(c) pressing said length of said reinforcing material heated in step (a) onto a substrate by contacting said substrate and said length of said reinforcing material with a rotatable peripheral surface of a wheel mounted for rotation on an axle; and (d) preventing said length of said reinforcing material from contacting said axle and interfering with the rotation of said wheel by at least partially covering each end of said axle.

7. The method of claim 6 wherein step (d) includes shielding said axle from said reinforcing material.

8. The method of claim 6, including in step (a), moving said length through an elongate hollow outlet portion of said heating unit having a substantially constant radius of curvature.

9. A method of applying an elongate continuous reinforcing material having an intimately associated adhesive, said adhesive being a coating on said reinforcing material, comprising:

(a) heating a length of said reinforcing material by moving said length through a heating unit from an inlet orifice to an outlet orifice, said outlet orifice on an inclined planar surface sloped outwardly and downwardly, said incline planar surface having a lip;

(b) during step (a), heating and softening said adhesive to a flow point of said adhesive, at least a portion of said adhesive flowing and becoming disassociated from said reinforcing material when said reinforcing material exits said outlet orifice;

(c) pressing said length of reinforcing material heated in step (a) onto a bottom surface of a substrate located proximate said outlet orifice;

(d) said inclined planar surface intercepting said portion of said adhesive;

(e) said adhesive collecting on said lip; and (f) applying at least said portion to said bottom surface of said substrate.

10. The method of claim 9 wherein said reinforcing material exits said outlet orifice on an arcuate path defined by an outlet portion of said heating unit having a substantially constant radius of curvature.

11. The method of claim 9 wherein step (f) includes transferring at least said portion to said substrate on a peripheral surface of a rotating wheel.

* * * * *